US005350507A

United States Patent [19]
McManus

[11] Patent Number: 5,350,507
[45] Date of Patent: Sep. 27, 1994

[54] CONTACT DEVICE AND CONTAINER FOR A ROTATING BIOLOGICAL CONTACTOR

[75] Inventor: Michael J. McManus, Erie, Pa.

[73] Assignee: Geo-Form, Inc., Girard, Pa.

[21] Appl. No.: 68,773

[22] Filed: Jun. 1, 1993

[51] Int. Cl.⁵ .............................. C02F 3/08; C02F 3/10
[52] U.S. Cl. .................................... 210/150; 210/151; 261/DIG. 72
[58] Field of Search .............................. 210/150, 151; 261/DIG. 72, 122

[56] References Cited

U.S. PATENT DOCUMENTS

| D. 232,174 | 7/1974 | La Borde | 261/DIG. 72 |
|---|---|---|---|
| D. 232,236 | 7/1974 | LaBorde | D23/1 |
| D. 232,237 | 7/1974 | LaBorde | D23/1 |
| D. 232,238 | 7/1974 | LaBorde | D23/1 |
| 2,212,932 | 8/1940 | Fairlie | 261/94 |
| 3,364,656 | 1/1968 | Whiton et al. | 55/91 |
| 3,389,798 | 6/1968 | Hartmann et al. | 210/150 |
| 3,540,589 | 11/1970 | Boris | 210/150 |
| 3,758,087 | 9/1973 | Hoon, Jr. | 261/94 |
| 3,882,027 | 5/1975 | Lunt | 210/500 |
| 3,894,899 | 7/1975 | Konopatou et al. | 210/404 |
| 3,913,890 | 10/1975 | Lankenau et al. | 259/3 |
| 3,957,931 | 5/1976 | Ellis et al. | 261/98 |
| 3,985,653 | 10/1976 | Ahlgren | 210/150 |
| 4,028,244 | 6/1977 | Holmberg | 210/150 |
| 4,086,307 | 4/1978 | Glaspie | 261/DIG. 72 |
| 4,115,269 | 9/1978 | Bennett et al. | 210/150 |
| 4,137,172 | 1/1979 | Sako et al. | 210/150 |
| 4,160,736 | 7/1979 | Prosser | 210/150 |
| 4,200,532 | 4/1980 | Iwatani et al. | 210/151 |
| 4,275,019 | 6/1981 | Bednarski | 261/DIG. 72 |
| 4,333,893 | 6/1982 | Clyde | 210/150 |
| 4,419,165 | 12/1983 | LaValley | 210/404 |
| 4,425,285 | 1/1984 | Shimoi et al. | 261/95 |
| 4,468,326 | 8/1984 | Kawert | 210/150 |
| 4,537,731 | 8/1985 | Billet et al. | 261/DIG. 72 |
| 4,540,491 | 9/1985 | Zimmer | 210/150 |
| 4,554,114 | 11/1985 | Glen et al. | 261/95 |
| 4,668,387 | 5/1987 | Davie et al. | 210/150 |
| 4,668,442 | 5/1987 | Lang | 261/94 |
| 4,729,828 | 3/1988 | Miller | 210/150 |
| 4,737,278 | 4/1988 | Miller | 210/150 |
| 4,842,920 | 6/1989 | Banai et al. | 428/184 |
| 4,921,661 | 5/1990 | Lavin | 261/112.2 |
| 5,112,760 | 5/1992 | Baumgartner et al. | 210/150 |

FOREIGN PATENT DOCUMENTS

| 0008810 | 3/1980 | European Pat. Off. | 210/150 |
|---|---|---|---|
| 1405374 | 11/1965 | France . | |
| 0012146 | 1/1979 | Japan | 210/150 |
| 55-167021 | 12/1980 | Japan | 261/DIG. 72 |
| 193633 | 1/1938 | Switzerland | 210/150 |
| 1423503 | 9/1988 | U.S.S.R. | 210/150 |
| 1275116 | 5/1972 | United Kingdom . | |

Primary Examiner—Cynthia L. Nessler
Attorney, Agent, or Firm—Lovercheck and Lovercheck

[57] ABSTRACT

A biological reactor and media members wherein the reactor is made up of a hollow drum having end shields with openings in the drum periphery so that liquid can flow through the drum periphery. The drum is supported by outwardly extending shafts attached to end shields and no shaft section is disposed inside the drum. Hemispherical shaped hollow media members with internal ribs are supported in the drum for bacteria to form on and legs are attached to the outside of the hollow media members to engage other media members and thus, providing further agitation. About forty percent (40%) of the drum is disposed in the liquid.

4 Claims, 4 Drawing Sheets

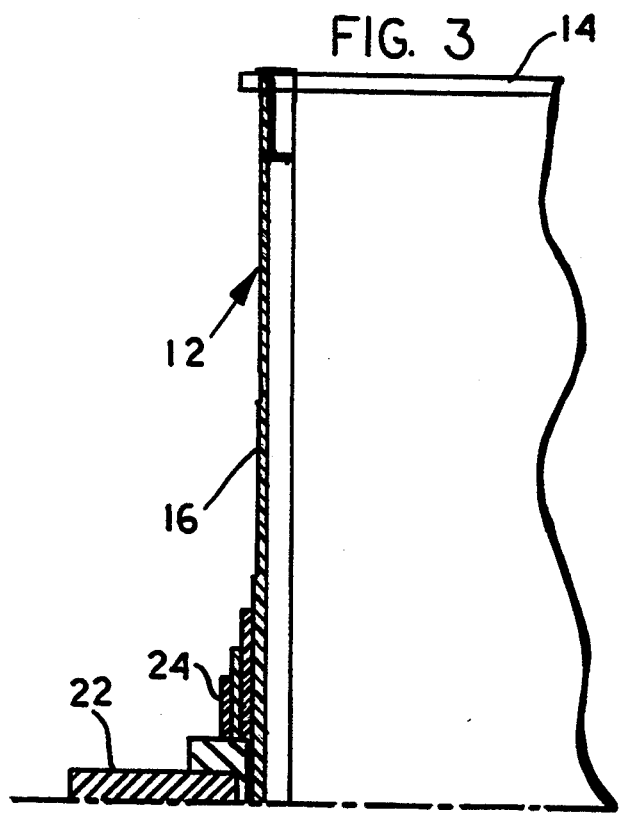
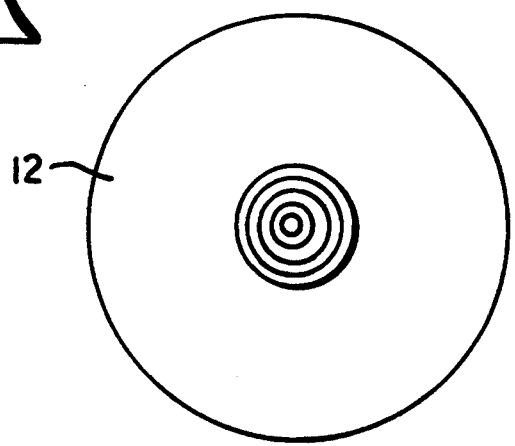
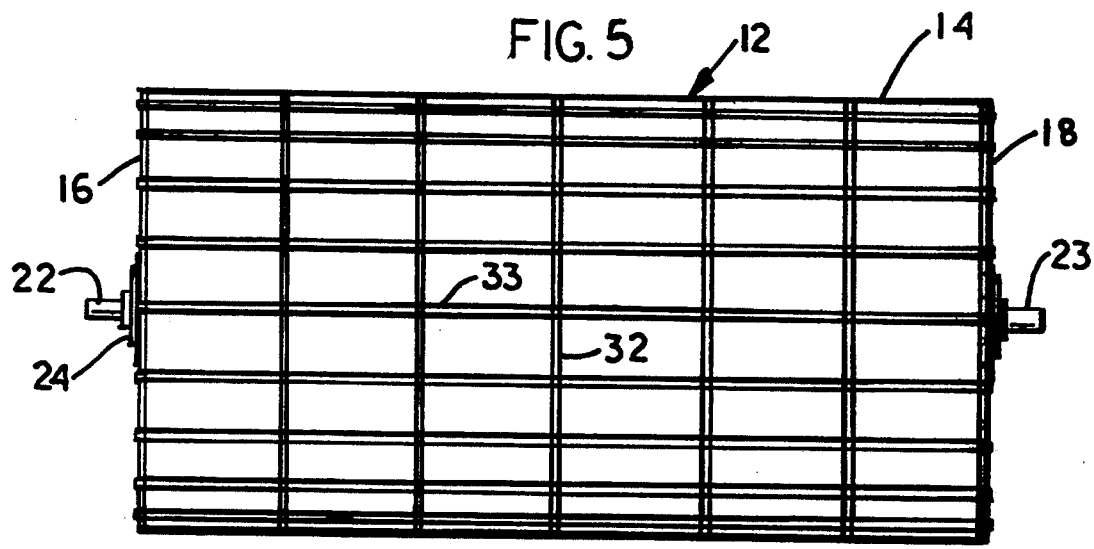

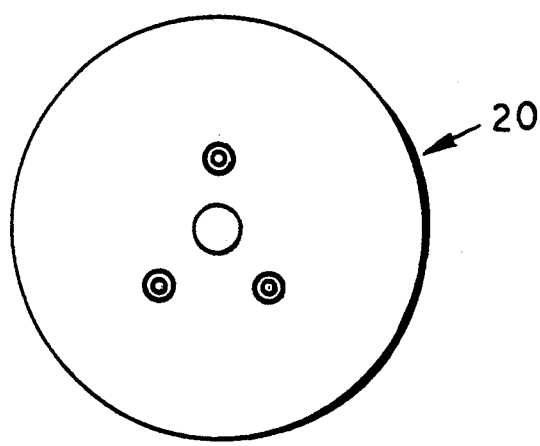
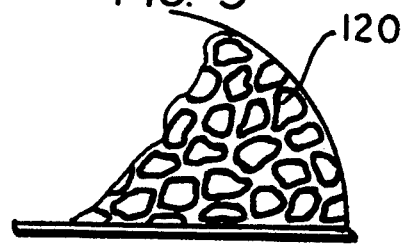
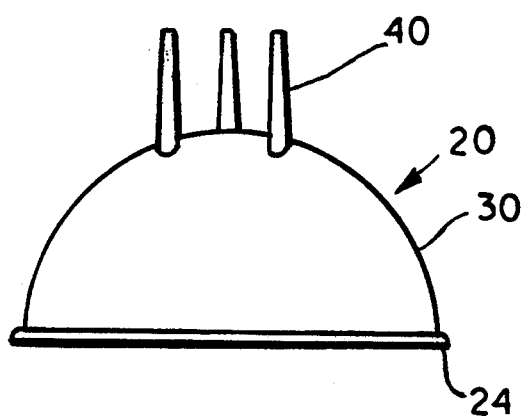
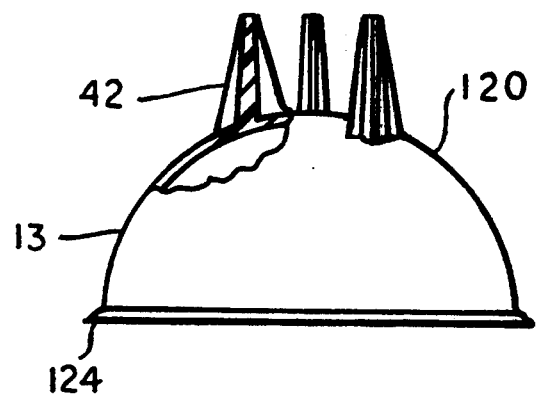
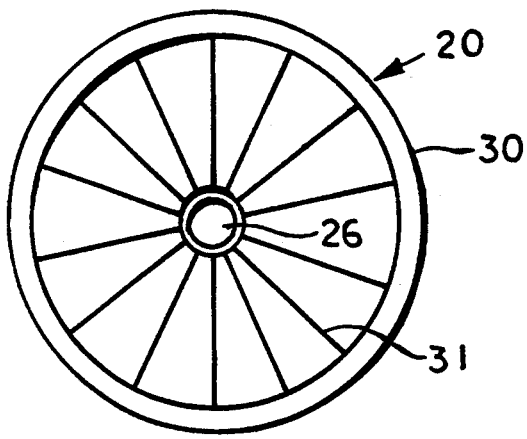
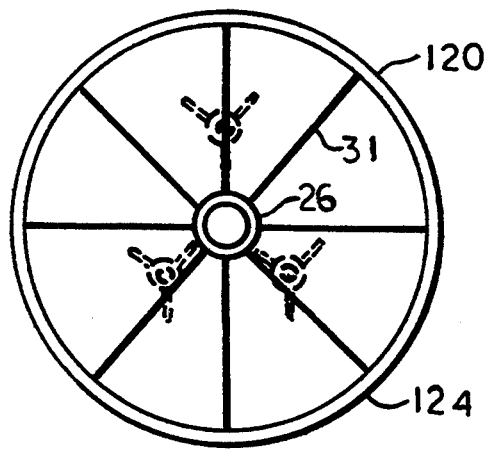

CONTACT DEVICE AND CONTAINER FOR A ROTATING BIOLOGICAL CONTACTOR

BACKGROUND OF THE INVENTION

All known Rotating Biological Contactors (RBCs) have a common rotating shaft surrounded by media. These secondary biological treatment devices are exposed to the primary clarifier effluent and constantly rotate during the treatment process. This rotational force causes the solids to accumulate in the shaft area.

Applicant is aware of the following U.S. Patents which revolve around rotating biological contactors: U.S. Pat. No. DES. 232,236 to LaBorde for a module for a filter media or similar article; U.S. Pat. No. DES. 232,237 to LaBorde for a module for a filter media or similar article; U.S. Pat. No. DES. 232,238 to LaBorde for a module for a filter media or similar article; U.S. Pat. No. 2,212,932 to Fairlie for a filling material for reaction spaces; U.S. Pat. No. 3,364,656 to Whiton, et al for a method for effecting countercurrent contacting of gas and liquid streams; U.S. Pat. No. 3,540,589 to Boris for an apparatus for the purification of polluted water; U.S. Pat. No. 3,758,087 to Hoon, Jr. for a contact device; U.S. Pat. No. 3,882,027 to Lunt for a random packing medium; U.S. Pat. No. 3,913,890 to Lankenau, et al for relatively hard unattached objects to inhibit caking and scaling in a horizontal pipeline; U.S. Pat. No. 3,957,931 to Ellis, et al for a fluid-fluid contact method and apparatus; U.S. Pat. No. 4,115,269 to Bennett, et al for random packing materials; U.S. Pat. No. 4,137,172 to Sako, et al for rotating biological contactor; U.S. Pat. No. 4,160,736 to Prosser for a rotating trickling filter; U.S. Pat. No. 4,200,532 to Iwatani, et al for a waste water treatment apparatus; U.S. Pat. No. 4,333,893 to Clyde for a high area contactor; U.S. Pat. No. 4,425,285 to Shimoi, et al for a packing material unit; U.S. Pat. No. 4,554,114 to Glen, et al for a packing element and method using same; U.S. Pat. No. 4,668,442 to Lang for column packing; U.S. Pat. No. 4,842,920 to Banal, et al for plastics elements for inordinate film-flow packings; U.S. Pat. No. 4,921,641 to Lavin for liquid-vapor contact columns; and, U.S. Pat. No. 5,112,760 to Baumgartner, et al for a mass transfer membrane for oxygenation of animal cell reactors. Applicant is also aware of the following foreign patents: British Patent No. 1,275,116 and French Patent No. 1,405,374.

Rotating Biological Contactor (RBC) technology involves a fixed film, attached growth biological reactor for reducing the organic components of domestic and industrial waste waters.

RBCs consist of a center shaft, usually constructed of steel, with plastic sheets (Media) attached to that shaft. These sheets of media are typically twelve feet in diameter. The media is typically forty percent (40%) immersed in waste water. As the shaft rotates, films of the waste water adhere to the plastic media. Bacteria, present in the waste water, adhere to the plastic sheets as a film of slime. This film is called the bio-mass. While it is impossible to count each bacteria or the clusters of bacteria, the population of bacteria is defined by the square footage of surface area that the plastic media provides as residence.

Bacteria, like people, require two basic fundamental elements to sustain their life and propagate: 1. Oxygen and 2. Food. As the RBC rotates, the bacteria are subjected to the atmosphere, which is their source of oxygen. As the rotation continues, the bacteria become immersed in the waste water. The organic constituents of the waste water become the food source for the bacteria. Thus, as the bacteria sustain their own life, they reduce the contamination in the waste water by utilizing the organic matter as food.

This method of waste water treatment was developed in the early 1970's. There was some activity in Europe in 1968, but these were really preliminary efforts that led to the current technology. The earliest studies done in the U.S. on prototype units were done in about 1973. The RBC process employs four basic components in its approach. There is a concrete holding tank, a central shaft to which is attached the "media", the "Media" itself and a power transmission system that keeps the media in constant rotational motion.

The tank provides the environment in which the process occurs. It constricts the path of the waste water stream to allow maximum exposure of the waste stream to the "media". The steel shaft can consist of a hollow tube or solid shaft and can be round, square, or octagonal in shape. The "media" is the heart of the process. The "media" provides the surface area for bacteria to attach themselves. The greater the surface area available, the larger the bacteria population for the digestive process. In conventional RBCs, the media consists of alternate layers of formed and flat sheets of polyethylene, thermally welded to produce controlled, uniform spacing. The media is attached to the shaft through a hub assembly and the final shape of the RBC is a cylindrical drum. In the actual operation of the RBC unit, the polyethylene sheet is submerged forty percent into the waste water stream. By a constant rotational action (approximately 1.6 revolutions per minute) the media surfaces are kept in contact with the waste stream. This rotational action is designed to alternately expose the bacteria to the waste stream as a food source and to then expose the bacteria to the air for oxygenation. It is through this alternate exposure that the digestive process is optimized.

The major advantage of this process is that it is simple and energy efficient to run. The installation is cost competitive with other systems; however, the major cost advantage is in its low energy requirements during operation. The biological effectiveness of the process makes it attractive; however, the current technology does not optimize bacteria growth, nor utilization of the bio-mass. Disadvantages of RBCs are numerous. From a process performance perspective, RBCs have a limited oxygenation capacity. The media is only forty percent immersed in the waste water. Therefore, a "dead zone" exists near the center shaft. Solids accumulate and build-up near the center shaft because radial velocities are minimal, and the area is subject to minimal water scouring. Because of these reasons, many RBCs never perform to the standards of the original design. Operational data demonstrates the system is unreliable, inconsistent, and undependable.

The media has experienced problems of collapsing due to the weight of the solids build-up and retention. Additionally, many problems have been realized in the failure of the bonding of the plastic media sheets to the center steel shaft.

Shaft problems have been experienced where the shaft would shear under the load of excessive solids retained by the media. Because of this anticipated excessive loading, bearing problems have also been realized.

SUMMARY OF THE INVENTION

The first significant difference between the applicant's invention and a conventional RBC is that applicant utilizes a random loose media rather than fixed sheets of plastic. The media can be made from either polyethylene or polypropylene. The random nature of the media allows the media to tumble during the rotation of the system, facilitating self-cleaning and increased oxygenation of the effluent. A second significant improvement centers around the use of a composite material (fiberglass) drum to hold the random media. The drum is approximately seventy percent open space to enhance hydraulic movement of the waste water. This structure is non-corrosive due to its construction materials. It is also designed without a center shaft; thus, it is not subject to shaft breakage. The incorporation of a tumbling media eliminates the dead zone at the center of rotation. The media moves randomly from the center to the outside and then back toward the center.

The media has several characteristics that offers improved performance over sheet media. First of all, it is hemispherical in shape. This geometry allows the media to trap air as it enters into the liquor during its rotational path. Somewhere toward the bottom of its rotational path, it will release the trapped air which promotes oxygenation of the effluent. While the media continues on its rotational path in an upward direction, its cup shape bails the water and begins to lift the liquor above the mean level of the waste water. Again, at some point toward the apex of the rotational path, the hemispherical media will upset and dump its cargo of waste water causing it to trickle over the other media on its path back to the liquor mean level. This is a second oxygenation action; and contact area of the waste water with the bio-mass.

The media has other significant features which aid the process. The inside of the hemisphere contains radial ribs perpendicular to the curvature of the hemisphere. These ribs not only give strength to the geometry of the hemisphere, they also give surface area on which bacteria can grow. By increasing or decreasing the number of ribs, the surface area of the hemisphere can be controlled. One additional function of the ribs is to prevent the media pieces from "nesting" during operation. "Nesting" would reduce the effective surface area of the process. Also, incorporated in the design of the hemisphere is a textured surface on the outside of the hemisphere. This texture gives the bacteria an undisturbed surface on which to adhere. Since the random media has a natural tendency to scour itself because of the rubbing action of one media piece against another, the raised surface of the texture contact one another while the depressed area remain protected. A final significant design feature of the media in the incorporation of several legs protruding from the surface farthest from the major diameter of the hemisphere. These appendages, which are about $\frac{1}{8}$th of an inch long, prevent the media from sliding when it reaches the apex of its circular path. By causing the media to tumble instead of slide, they facilitate the dumping of the liquor thus promoting the trickling effect.

The cylindrical drum which contains the loose media has several features which significantly improves the operation of the system. First, it is designed to be constructed from a composite material (fiberglass). This removes the element of corrosion from the structure itself. The environment of this entire process is quite corrosive so that any metal parts suffer oxidation. The second feature is that the drum is fabricated by utilizing a filament winding process on a mandrel. By controlling the filament placement in the winding process, a drum is produced with approximately seventy percent open area to facilitate the unrestricted flow of the liquor into the drum and around the media. This construction is also designed to be of sufficient strength to allow for the elimination of the center shaft normally found in equipment in the process. The elimination of the center shaft removes a major weakness of the RBC systems as they now exist. The elimination of the center shaft also aids in the elimination of a center "dead zone" during rotation. By incorporating composite materials technology into the rotating cylinder, significant weight is eliminated, thus reducing the energy requirements of the system during operation.

An object of the invention is to provide an improved hemispherical shaped random media members for a biological waste water treatment device.

Another object of the invention to provide an improved random media with a textural surface.

Another object of the invention is to provide an improved random media drum without a center shaft.

Another object of the invention is to provide random media with a textured outside surface.

Another object of the invention is to provide random media with legs attached to the outside surface.

It is another object of the present invention to provide a contact device and container that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

FIG. 3 is an enlarged partial cross sectional view of the rotational biological contactor rotor taken on line 3—3 of FIG. 2.

FIG. 4 is an end view of the rotor as shown in FIG. 3.

FIG. 5 is a side view of the rotor with part of the cover removed.

FIG. 6 is a top view of one of the media members used in the rotational biological contactor shown in FIGS. 1 through 5.

FIG. 7 is a side view of one media member.

FIG. 8 is a bottom view of one embodiment of the media member shown in FIG. 7.

FIG. 9 is an enlarged partial view of the media member.

FIG. 10 is a side view partly in cross section of another embodiment of the media members.

FIG. 11 is a bottom view of the media member shown in FIG. 10.

DESCRIPTION OF THE PREFERRED EMBODIMENT(S)

Figure 1:
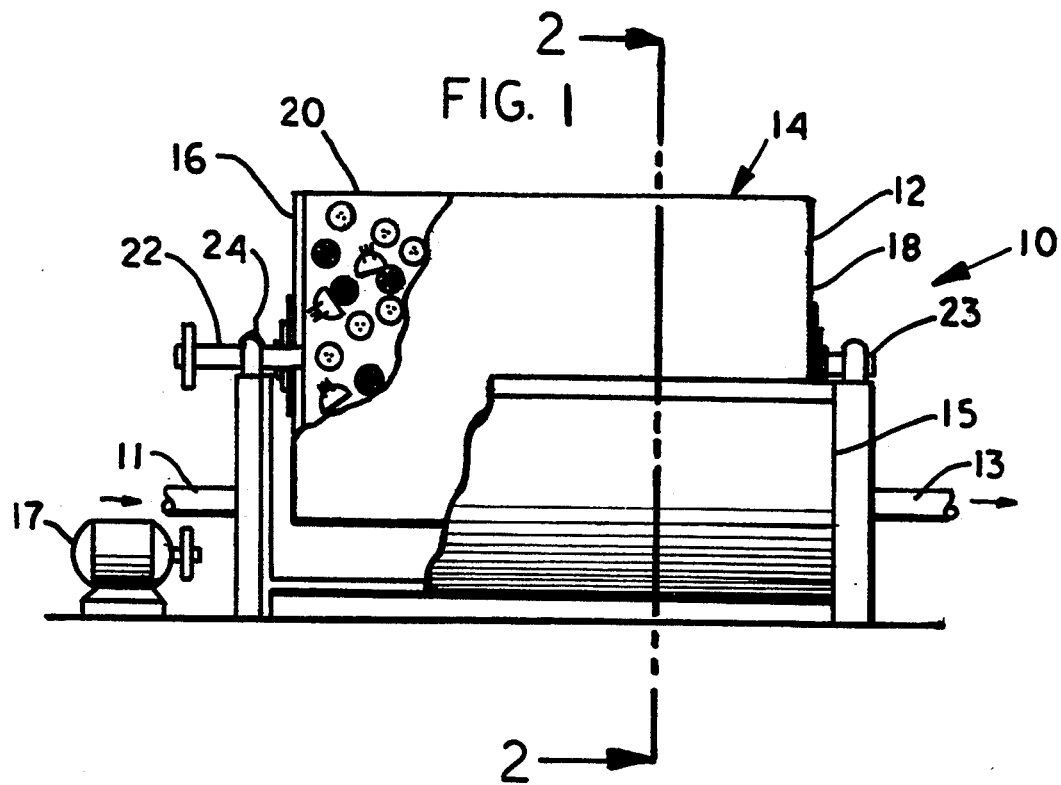
FIG. 1 is a side view partly in section of the rotational biological contactor according to the invention.
Figure 2:
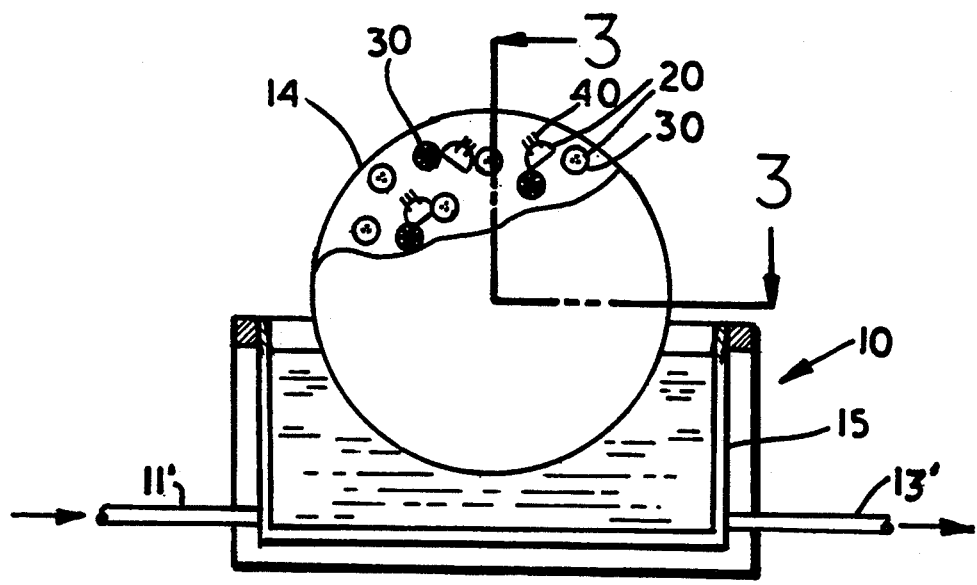
FIG. 2 is a cross sectional view taken on line 2—2 of FIG. 1.

Now with more particular reference to the drawings disclosed herein, reactor 10 is used in the aerobic biobacterialogical treatment of polluted waste water and is made up of drum 17 rotating by motor 17 having hollow cylindrical body 14 made of fiberglass, having openings extending through the drum peripheral, and having end shields 16,18 which close the ends of hollow cylindrical body 14. Hollow cylindrical body 14 has partition 32 and is rotatable on stub shafts 22 that are fixed to end shields 16,18 and are rotatably received in bearings 24 supported on tank 15 having inlet 11 and outlet 13 at opposite ends to provide a drum with an interior free of obstruction by a shaft. Stub shafts 22 terminate at the outside of end shields 16,18 and do not extend through rotatable drum 12 to obstruct the movement of media members 20 therein.

Media members 20 have hollow hemispherical bodies 30 with legs 40 integrally attached thereto and extending therefrom. Legs 40 are of a length of about one-half of the diameter of hemispherical bodies 30. Tank 15 has sides and bottom parallel to the axis of stub shafts 22 and 23. Tank 15 could have inlet 11' and outlet 13' at opposite sides to provide flow through tank 15 perpendicular to stub shafts 22.

Gusset plates 42 extend upwardly and outwardly from legs 40 and are integrally attached to the bottom of hemispherical bodies 30. Gusset plates 42 reinforce legs 40 and add additional areas to which bacteria may adhere. Internal ribs 31 are in the form of partitions which are attached to central hollow cylindrical member 26 extends radially outwardly therefrom and internal ribs 31 are integrally attached at their outer ends to the inner periphery of hollow hemispherical bodies 30. Legs 40 on each media members 20 engage other media members 20 and hold them apart and also cause media members 20 to have a tumbling action in the liquid being treated.

The lowest density media as used herein refers to the lowest number of internal ribs 31 in media members 120, while a larger number of ribs are used in media members 20. In later stages of reactor 10, media members 120 have higher numbers of ribs 31 and therefore, greater density. The term "density" used herein does not refer to the number of media members 20,120, but refers to the square feet of surface area of plastic are per cubic foot of volume of media.

Figure 12:
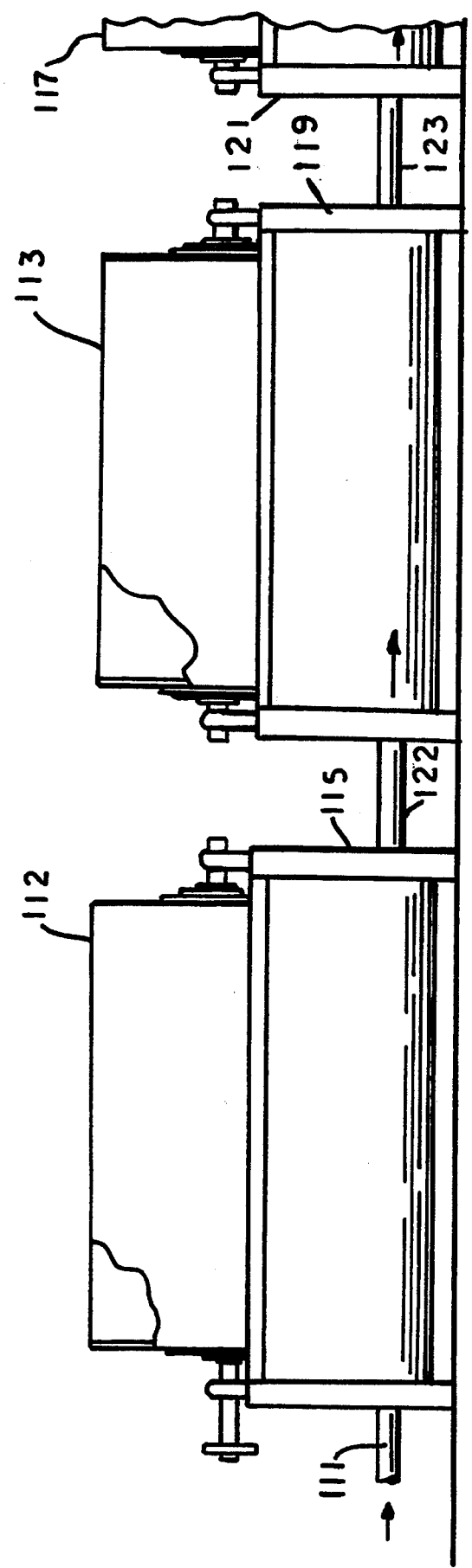
FIG. 12 shows another embodiment of the invention wherein a plurality of drums and tanks are shown connected in axial relation to one another.

Several rotatable drums 112,113,117 can be supported in a single tank 115. Each drum 112,113,117, as shown in FIG. 12, contains a different density media. Rotatable drum 112 could be adjacent inlet 111 to tank 115. Rotatable drum 112 would be considered to be the first stage. Solids in this first stage will be at the highest levels of concentration. Therefore, the lowest density media is used in the part of tank 115 which provides a lower population of bacteria per cubic foot of media for best BOD reduction in order to minimize solids plugging media members 120. Separate tanks could be provided and connected by suitable lines. Additionally, drum 112,113 and 117 can be used in an axial flow pattern.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A biological reactor for use in the aerobic bacteriological treatment of polluted waste water comprising a rotatable drum and a tank containing said polluted waste water;

said rotatable drum being at least partially disposed within said tank;

said rotatable drum having a hollow cylindrical body;

said rotatable drum having end shields closing the ends of said body of said drum;

said reactor further comprising means for rotating said drum in said tank;

a plurality of media members being received in said body of said drum, said plurality of media members providing means for supporting bacteria;

each of said plurality of media members having a generally hemispherical body;

said end shields each having a stub shaft means fixed thereto and extending outwardly and not inwardly and providing a space clear of said stub shaft means between said end shields;

said reactor further comprising bearing means supporting said stub shaft means on said tank; and, said drum having axially spaced partitions therein dividing said drum into a plurality of sections, said plurality of media members being disposed in each of said plurality of sections, said plurality of media members in one of said plurality of sections having a different density from the density of said plurality of media members in another of said plurality of sections.

2. A biological reactor for use in the aerobic bacteriological treatment of polluted waste water comprising a rotatable drum and a tank containing said polluted waste water;

said rotatable drum being at least partially disposed within said tank;

said rotatable drum having a hollow cylindrical body;

said rotatable drum having end shields closing the ends of said body of said drum;

said reactor further comprising means for rotating said drum in said tank;

a plurality of media members being received in said body of said drum, said plurality of media members providing means for supporting bacteria;

each of said plurality of media members having a generally hemispherical body, each of said plurality of media members further having plate-like ribs fixed to said hemispherical body;

said end shields each having a stub shaft means fixed thereto and extending outwardly and not inwardly and providing a space clear of said stub shaft means between said end shields;

said reactor further comprising bearing means supporting said stub shaft means on said tank;

said drum having axially spaced partitions therein dividing said drum into a plurality of sections, said plurality of media members being disposed in each of said plurality of sections, said plurality of media members in one of said plurality of sections having a different density from the density of said plurality of media members in another of said plurality of sections;

wherein said plate-like ribs of each of said plurality of media members constitute additional means for supporting bacteria.

3. A biological reactor for use in the aerobic bacteriological treatment of polluted waste water comprising a rotatable drum and a tank containing said polluted waste water;

said rotatable drum being at least partially disposed within said tank;

said rotatable drum having a hollow cylindrical body;

said rotatable drum having end shields closing the ends of said body of said drum;

said reactor further comprising means for rotating said drum in said tank;

a plurality of media members being received in said body of said drum, said plurality of media members providing means for supporting bacteria;

each of said plurality of media members having a generally hemispherical body;

said end shields each having a stub shaft means fixed thereto and extending outwardly and not inwardly and providing a space clear of said stub shaft means between said end shields;

said reactor further comprising bearing means supporting said stub shaft means on said tank;

said drum having at least one partition therein dividing said drum into at least two compartments;

said plurality of media members being disposed in each of the at least two compartments; and, said plurality of media members in one of said at least two compartments having a higher density than the density of said plurality of media members in another of said at least two compartments.

4. The reactor of claim 3 wherein each of said plurality of media members in one of said at least two compartments has more surface area that the surface area of each of said plurality of media members in another of said at least two compartments.

* * * * *